(No Model.)
2 Sheets—Sheet 1.
W. T. LYON.
DENTAL APPLIANCE.
No. 595,068.
Patented Dec. 7, 1897.
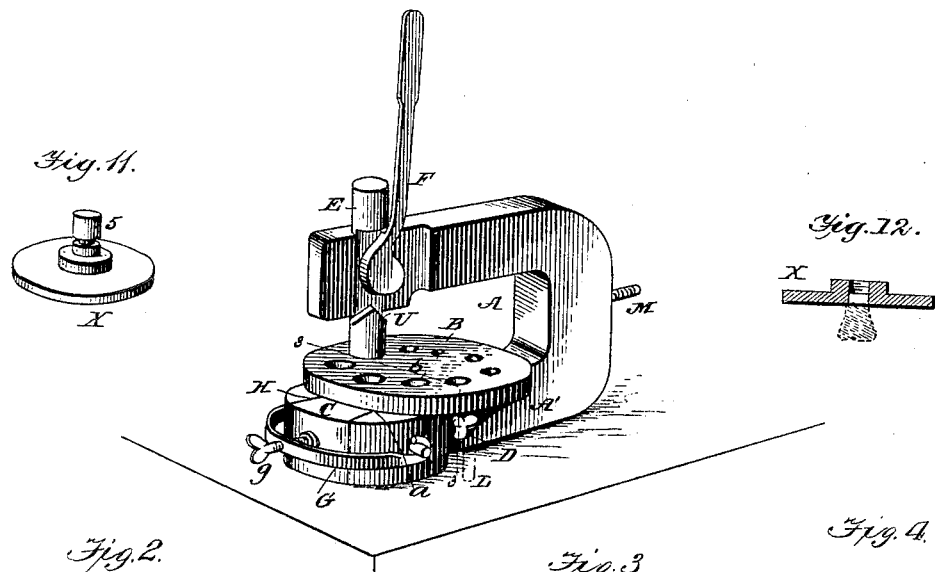
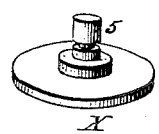
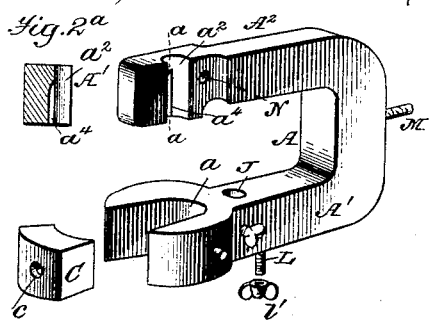
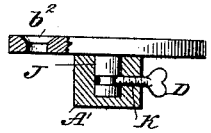
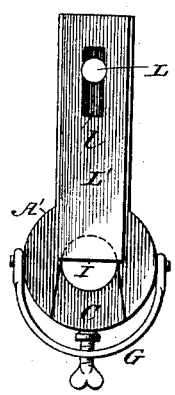
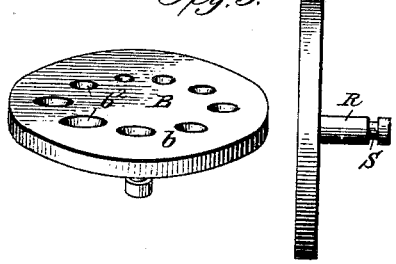
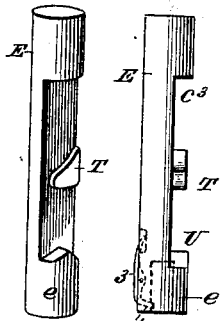
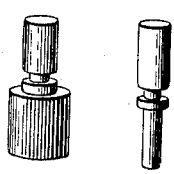
WITNESSES:
J. C. Shaw
J. E. Luckett
INVENTOR
W. T. LYON
BY
Fred G. Dieterich
ATTORNEYS (No Model.) 2 Sheets—Sheet 2.
W. T. LYON.
DENTAL APPLIANCE.
No. 595,068. Patented Dec. 7, 1897.
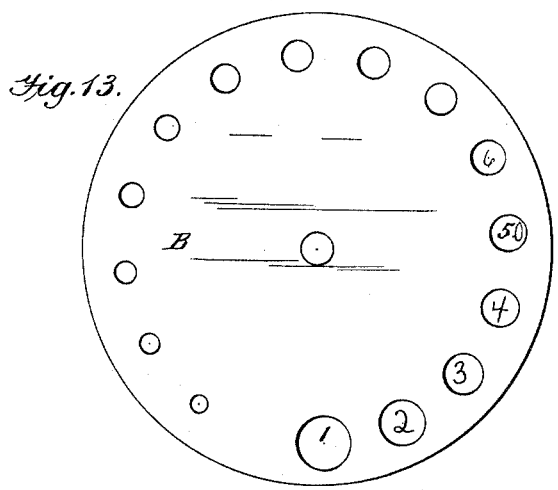
Fig. 13.
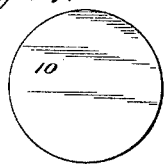
Fig. 14.
Fig. 15.
Fig. 16.
Fig. 17.
Fig. 18.
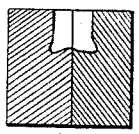
Fig. 19.
WITNESSES:
J. C. Shaw
J. E. Luckett
INVENTOR
Wm. T. Lyon
BY
Fred G. Dieterich & Co.
ATTORNEYS

UNITED STATES PATENT OFFICE.

WILLIAM T. LYON, OF PORTLAND, OREGON.

DENTAL APPLIANCE.

SPECIFICATION forming part of Letters Patent No. 595,068, dated December 7, 1897.

Application filed September 15, 1896. Serial No. 605,894. (No model.)

*To all whom it may concern:*

Be it known that I, WILLIAM T. LYON, residing at Portland, in the county of Multnomah and State of Oregon, have invented a new and useful Dental Appliance, of which the following is a specification.

My invention is in the nature of a dental appliance or machine for making and shaping seamless metal crowns for artificial teeth, and primarily has for its object to provide a machine of this character of a very simple and inexpensive nature which can be easily manipulated and which will effectively serve for its intended purposes.

Furthermore, my invention has for its object to provide an appliance by which crowns can be produced for use either on molars, bicuspids, or incisors in such a manner as to take the form of the natural tooth as to the exterior and grinding surfaces.

With other objects in view, which will hereinafter be made clear, the invention consists in an appliance of the character stated embodying the peculiar combination and novel arrangement of parts, such as will be first described in detail and then be specifically pointed out in the appended claims, reference being had to the accompanying drawings, in which—

Figure 1 is a perspective view of my appliance in one of its forms. Fig. 2 is a view of the main frame, the front section being detached. Fig. 2ª is a detail section taken on the line *a a* of Fig. 2. Fig. 3 is a partial section and partial edge view of the disk B and member A' as seen practically on the line 3 3 of Fig. 1. Fig. 4 is an inverted plan view, such as will be hereinafter specifically referred to. Fig. 5 illustrates the revolving disk, also hereinafter referred to. Fig. 6 is a plan view of the slide or cut-off plate. Fig. 7 illustrates in perspective and in edge view the shaft member E. Fig. 8 represents two forms of the numerous dies. Fig. 9 represents the lever for raising and lowering the shaft. Fig. 10 is a view of the mold or matrix holder, hereinafter described; and Figs. 11 and 12 are detail views, also hereinafter specifically referred to. Fig. 13 is a plan view of the disk B. Fig. 14 is a plan view of the disk-plate from which the crown is made. Fig. 15 is a view of the cup formed therefrom at the first operation. Fig. 16 is a view of the completed cup. Fig. 17 is a view of one form of crown made up of the cup shown in Fig. 16. Fig. 18 is another shape of crown, referred to hereinafter; and Fig. 19 is a view of the divided-matrix member used in forming the crown shown in Fig. 18.

In its practical construction my dental appliance embodies a metal frame A, preferably about six inches high and of same length and three-fourths of an inch wide and thick and of a substantially ⊐-shaped form, as clearly shown in Fig. 2.

The member A' is enlarged and has a central opening *a*, which widens at the front end and forms an opening H to receive a wedge-shaped detachable section C, the inner end of which is concaved, so that when in place in the main frame a central circular opening I will be produced, as clearly shown in Fig. 4.

J indicates a socket in the member A', which is bisected by a screw-aperture K, as clearly shown in Fig. 3, the purpose of which will presently appear.

The frame A has a pin L projected from the member A' and a similar member M projected from the rear or heel portion thereof, such pins providing simple means for holding the frame steady on the table or rest portion when the frame is set to the position shown in Fig. 1 or when on end during pouring of the metal, as hereinafter will be fully set forth.

The member A² of the frame has a vertical semicircular socket $a^2$ to receive and guide the plunger-shaft E, such member having a portion reduced in thickness or recessed, as at $c^3$, to provide for a free operation of the lever F, the base of such socket $a^2$ having a vertical groove $a^4$, the upper end of which bevels outward, as clearly shown in Fig. 2ª.

The shaft E is of a diameter to snugly fit the socket $a^2$, and has at the lower end a socket portion *e*, adapted to receive the shanks of the removable dies, several of which are shown in Fig. 8, one wall of such socket *e* being apertured for the passage of the toe 4 of a latch member 3, pivotally connected to the lower end of the said shaft E, its upper end being in the nature of a spring-heel which projects beyond the vertical plane of the shaft, and while it normally serves to hold the toe portion 4 to project within the socket $e$ it is adapted, when the shaft is raised in the manner presently explained, to engage the beveled part of the groove $a^4$ and thereby to cause the lower or toe end to become disengaged from the die and allow its being readily removed, the several dies having annular grooves in their shank members to receive the said toe portion of the latch, as shown.

B indicates a disk which is preferably of three and one-half inches diameter and about one-half inch thick and provided with nine (more or less) apertures $b$, arranged concentrically in a single line, all being of different diameters and provided with concaved upper ends $b^2$, their remaining portions being straight, as clearly shown in Fig. 3, the largest aperture being about three-fourths of an inch in diameter, while the smallest is about one-eighth, the decrease in diameter being gradual from the largest to the smallest. The disk B has a central pendent shank R, which has a groove S and which is adapted to fit the hole J and is held in place by the thumb-screw D, as clearly shown in Fig. 3.

The shaft E, heretofore referred to, has a shoulder U near its lower end and a projection T about midway thereof, with which the lever F alternately engages for raising and lowering the shaft, as will presently more fully appear.

The lever F is pivotally connected to the main frame, it having a stud-pin $f$, which enters the socket N of the member $A^2$ of the frame, such lever having an eccentric or cam-bearing or lift-rim $f^2$, (see Fig. 9,) which is adapted to engage the under face of the member T to lift the shaft and an extension cam-rim $f^{20}$, adapted to engage the shoulders U to depress the shaft.

The removable section C has a metal-receiving opening $c$, through which the molten metal is poured when a crown of the shape shown in Fig. 18 is to be formed, and such opening has its outer end flared to facilitate the pouring of the metal. The section C is held in place by the clamp G and screw $g$ when such form of crown is to be made.

L' indicates a slide-plate detachably held on the bottom of the main frame, which has a slot $l$, and is held to slide on the bolt L, it being held up against the bottom of frame by a winged nut $l'$.

In Fig. 8 are shown what I term "dies," they serving, however, merely as plungers to press sheet metal through the apertures in disk B, as many of these dies or plungers being employed as there are openings in the disk B, the diameters of the dies being, however, as much smaller than the holes for which they are provided as is necessary to admit sheet metal of about No. 30 standard wire-gage.

Fig. 11 illustrates a circular disk X, provided with a removable stem 5, which fits in the top thereof, the upper part of which stem is adapted to fit the socket in the lower end of the shaft E.

Fig. 10 illustrates an ordinary impression-tray for obtaining the impression of the tooth or teeth to be crowned.

The manner in which my appliance is used and the method employed to produce the different crowns is best explained as follows:

If a tooth to be crowned is of a size, say, of opening 50 on the disk B, (see Fig. 13,) the crown is started by taking a circular sheet-metal disk 10 (see Fig. 14) of gold, silver, aluminium, or platinum of suitable size and thickness. This disk 10 is placed over the first or largest hole on disk B and forced therein by lever-pressure until the cap-form 20 (shown in Fig. 15) is produced, which form is successively forced down into the gradually-reduced openings 2, 3, 4, and 6, the last operation producing the cup 30, (shown in Fig. 16,) which has the desired length and circumference to form the crown end or top of the tooth to be covered. To form such cup into a molar-crown such as is illustrated in Fig. 17, the following method is employed: An impression is taken of the natural or artificial tooth to be crowned, of the grinding-surface only, in the mold-cup shown in Fig. 10. The circular disk X is then placed on the impression-disk with hole directly over the impression or matrix portion. Metal is then poured through the opening in the disk until the matrix is entirely and the opening in the disk X partially filled, such operation producing a metal counterpart of the tooth held pendent from the disk X, as shown in Fig. 12. The disk X, with the metal tooth, is then placed over the large or No. 1 opening in the disk B, with its tooth portion projected into the opening $a$. The section C is then clamped in place, as is also the disk B, and the filling-hole in the section C is plugged up. The appliance is then turned with its bottom up and metal poured in at the lower end to surround the tooth-form, the metal just poured in fusing at a lower temperature than the metal tooth, Mallott's metal being preferably used for this purpose. After cooling the disk X the tooth-form is removed, which leaves a metal matrix of the tooth to be crowned, it being understood that this method can only be employed for a tooth-crown of the form shown in Fig. 17, one having practically straight sides to admit of a ready withdrawal of the metal tooth-form. Disk B is then turned until hole No. 5 is over the metal matrix in the opening or chamber $a$. The cup shown in Fig. 16 is then one-half filled with oil, shot, cotton, or soft rubber and placed in the metal matrix. Pin for No. 5 hole is then placed in the plunger and forced down into the partially-filled cup until the same has spread to snugly fit the internal counter of the tooth-matrix, such operation producing the complete crown-piece, as shown in Fig. 17.

When a crown having the shape shown in Fig. 18 is to be made, the device is placed on its end, the disk B, with the disk X and tooth-form, being held on one side, as before, and the slide-plate L' moved up to cover one-half of the opening a. Molten metal is then poured through the opening in the section C until the opening a is half-filled. When such poured metal is cool, the plate L' is slid up to entirely cover the opening a and a lower-fusing metal poured in to fill the opening a, such operation producing a divided matrix with the tooth impression in the center, as shown in Fig. 19.

Having thus described my invention, what I claim, and desire to secure by Letters Patent, is—

1. A dental appliance comprising a main frame having a chambered portion to receive the molten metal, one wall having a pouring-opening, a detachable and adjustable cover-plate for one end of the chamber, and means for holding the tooth-form projected through the other end of the said chamber for the purposes specified.

2. A dental appliance having at one end an opening I, a detachable disk having means for holding a tooth-form projected into the opening, a pouring-aperture communicating with the opening I and an adjustable slide-plate for covering all or part of the end of opening I opposite the disk-cover member as specified.

3. A dental appliance formed of a ⊓-shaped frame having an opening in one of its parallel members, and a plunger-shaft connected to its opposite member, a slide-plate movable over the under side of the aforesaid opening, a detachable centrally-apertured disk adapted to be held over the top of the opening in the aforesaid parallel member, and a shank to connect such disk to the plunger-shaft substantially as shown and for the purposes described.

4. A dental appliance comprising a main frame having a casting-chamber open at each end, an adjustable slide operating over the under side thereof and a disk having a stem adapted to fit over the top side of such chamber, a plunger-shaft and a lever for operating such shaft all arranged substantially as shown and described.

5. A dental appliance comprising a ⊓-shaped frame having means for holding it either on one of its long arms or base, the lower one of such arms having an aperture I, a detachable section C having a pouring-aperture, the slide-plate L' the disk X having stem 5, the plunger-shaft E having a lock device to engage the stem 5, and projections T and U and the lever F all arranged substantially as shown and for the purposes described.

6. In a dental appliance as described, the combination of the main frame, the plunger-shaft and the dies, the plunger-shaft having a spring-held device for holding the dies to the shaft, and trip means on the main frame adapted to engage such spring-holder as the shaft is elevated to release the die as specified.

7. In a dental appliance as described, the combination of the main frame having a circular-shaped opening I and a detachable section C having a pouring-opening, the clamp G the detachable rotary disk B having a series of concentric openings of a gradually-decreasing diameter, the shaft E and the lever F all being arranged substantially as shown and for the purposes described.

8. A dental appliance comprising the main frame, the tooth-form-holding disk X and stem 5, said frame having an opening I, and detachable section C having a pouring-opening, the clamp G the slide-plate L' the detachable apertured disk B, the sliding plunger E and the lever mechanism F all being arranged and combined for the purposes and substantially in the manner described.

9. A dental appliance, comprising means for pressing a metal disk into a cup shape, a matrix-forming chamber having a pouring-opening and a supplemental tooth-form holder, all arranged and combined in the manner substantially as shown and described.

WILLIAM T. LYON.

Witnesses:
H. E. FOWLER,
A. T. LEWIS.